United States Patent [19]
Lensing

[11] Patent Number: 6,126,183
[45] Date of Patent: Oct. 3, 2000

[54] FOLDABLE CART WITH AUTOMATIC BAG CONTROL

[75] Inventor: Robert E. Lensing, Fort Smith, Ark.

[73] Assignee: Stapleton Corporation, Van Buren, Ark.

[21] Appl. No.: 09/157,439

[22] Filed: Sep. 21, 1998

[51] Int. Cl.⁷ ..................................................... B62B 1/00
[52] U.S. Cl. ....................................................... 280/47.29
[58] Field of Search ........................... 280/47.29, 47.18, 280/47.19, 47.26, 47.28, 654; 248/97, 98, 99, 100

[56] References Cited

U.S. PATENT DOCUMENTS

| | | | |
|---|---|---|---|
| 2,789,829 | 4/1957 | Parker | 280/654 |
| 2,823,923 | 2/1958 | Marquardt | 280/654 |
| 2,938,748 | 5/1960 | Johnson | 280/654 |
| 3,041,026 | 6/1962 | Wilson | 280/654 |
| 3,797,847 | 3/1974 | Lindsey et al. | 280/36 C |
| 3,927,894 | 12/1975 | Zawislak | 280/47.26 |
| 3,992,034 | 11/1976 | Smith, Sr. et al. | 280/654 |
| 4,124,185 | 11/1978 | Preisinger | 248/98 |
| 4,179,132 | 12/1979 | Rich | 280/47.26 |
| 4,202,521 | 5/1980 | Harding | 248/98 |
| 4,343,487 | 8/1982 | Crothers | 280/654 |
| 4,458,367 | 7/1984 | Malik | 248/97 |
| 4,549,748 | 10/1985 | Haley, Sr. | 280/641 |
| 4,793,628 | 12/1988 | Haley, Sr. | 280/641 |
| 4,860,982 | 8/1989 | Berlant | 248/100 |
| 4,917,393 | 4/1990 | Rogers | 280/47.28 |
| 4,976,406 | 12/1990 | Buckley et al. | 280/641 |
| 5,048,778 | 9/1991 | Wright | 248/98 |
| 5,251,925 | 10/1993 | Haley, Sr. | 280/641 |
| 5,356,197 | 10/1994 | Simic | 280/47.18 |
| 5,456,431 | 10/1995 | Ilbnisky | 248/98 |

*Primary Examiner*—Brian L. Johnson
*Assistant Examiner*—Gerald Klebe
*Attorney, Agent, or Firm*—Stephen D. Carver

[57] ABSTRACT

A portable, wheeled cart foldable between stowage and deployed positions automatically captivates and suspends trash bags. A generally U-shaped and inverted main frame extends from a top forming a handle to the lower cart wheels. A companion subframe of generally U-shaped profile is pivoted to the frame. Preferably a foldable platform is provided at the cart base for supporting the trash bag. A wheel assembly axle pivotally connects the platform to the lower ends of the main frame. This allows the platform to fold and nest within the main frame thereby allowing the cart to present a compact profile for ease of storage and transport. The bag is captivated upon a pair of resilient, spaced apart clips that extend transversely across tile cart. These clips extend between and are yieldably, pivotally captivated within tipper suitable aligned orifices formed in the frame legs and the subframe legs. The clips have a mid-segment that is parallel to the handles of the cart. Each end of the clips comprises a friction notch presenting a generally V-shaped profile. The edge adjacent the open end of a trash bag is folded over tile mid-segment with part of the trash bag edge captured by the notch. As the subframe drops freely by gravity, the bag expands, and the pivoted clips frictionally captivate tile bag, and hold it in a deployed, open, trash receptive position. The clips accommodate a wide variety of trash bags.

3 Claims, 8 Drawing Sheets

FOLDABLE CART WITH AUTOMATIC BAG CONTROL

BACKGROUND OF THE INVENTION

1. Field of the Invention

The present invention relates generally to portable lawn carts of the type employed to hold miscellaneous articles including garbage bags and receptacles. More particularly, my invention relates to a portable, collapsible, wheeled cart for holding and transporting trash bags, particularly plastic trash bags. Known prior art relating to the field of the invention may be found in U.S. Class 248, Subclasses 97–99 and 101, and Class 280, Subclasses 35, 641, 651, 654.

2. The Prior Art

Most municipalities require residents to use flexible plastic trash bags for containing household garbage, grass, leaves, and other wastes associated with modern suburban life. This has led to the almost universal use of thin, lightweight, disposable plastic bags for containing household and garden trash, cut grass, leaves, and the like, as well as domestic garbage. These plastic bags are frequently made from extremely thin plastic. Tearing and rupture are common problem associated with moving these bags when they are filled with refuse.

There are many trash bag carts and trash bag holders on the market which incorporate a frame for holding and supporting the refuse bag. These devices employ complicated mechanisms for supporting the refuse bag. Typical structures employed to hold the bags in an open position are awkward and fragile. Most are unwieldy to use. Furthermore, they are not adaptable to bags of different sizes and shapes. Most no not fold into a convenient, reduced volume for storage when not in use. Various devices have been developed in the prior art to hold the trash bag open for filling, and to transport the bag in use. Carts, racks, hand trucks, and the like have been advanced. These prior art devices often employ massive and heavy frames and auxiliary supporting members, making them difficult and slow to assemble or disassemble. The user must expend considerable physical effort to move many of these prior art devices from place to place. The mechanisms adopted for holding and supporting the bags in these devices have involved cumbersome and complex mechanisms. These mechanisms include holding the bag open by prongs, hooks, clips, and clamping the edge between pairs of tubular frames. The user has considerable difficulty when attempting to disengage the bag from the apparatus when ready for disposal.

For example, in Lindsey et al, U.S. Pat. No. 3,797,847, a cart for trash bags is shown having a U-shaped frame for supporting and transporting a bag used for containing household refuse and the like. In this case, the trash bag is held open using heavy bent wires and braces pivotally mounted to the frame. The user is required to spend a considerable amount of time and effort to assemble and adjust the various components of the bag supporting means. Additionally, this cart does not provide any method for easily closing the trash bag after waste has been deposited in the trash bag and requires placing a separate cover over the trash bag. This separate cover must be used in order to avoid the diffusion of objectionable odors in the area surround the stored trash bag. The cover must also be used to effectively prevent insects, pests, and other vermin from entering the trash bag. This separate hand actuated closing means creates another part the user must maintain and locate or the trash cart's usefulness is greatly diminished.

U.S. Pat. No. 3,992,034 and U.S. Pat. No. 4,124,185 relate to bag holding handcarts that use an adjustable support ring to hold the trash bag open during filling. These devices require the user to open the support ring and fit the trash bag over the ring. The user must then secure the trash bag to the ring by tightening an adjustable clamping wire around tile outside of the support ring thereby securing the trash bag in place and keeping the trash bag open during filling. One problem with devices of this type is that the user must manipulate several parts to support and open the trash bag.

U.S. Pat. No. 4,179,132 discloses a hand truck for trash bag support and transport. The user wraps the edge adjacent the trash bag open end around a support loop. The user then secures the trash bag to the loop by placing several clamps about the loop. One problem with hand trucks of this type is that the operator must first manipulate the trash bag about a support, find the requisite clamps, then secure the trash bag to the loop. The operator expends his time and effort in an inefficient manner thereby increasing the length of the job and the labor involved.

U.S. Pat. No. 4,202,521 discloses a combination bag holder and dolly adapted to grip the open end of a trash bag by using an adjustable ring or loop. The surface of the ring or loop has a rough surface to further grip the trash bag. The device described attempts to remedy the problems associated with the use of several parts, clamps and the like in securing the trash bag. The user of a device of this type would place the open end of a trash bag over the adjustable loop. Then the loop would be extended to engage the open edge of the trash bag thereby placing stress on the trash bag. The trash bag is held in place through friction. One disadvantage of devices of this type is that the bag tends to fall from the loop or ring as the bag is filled to capacity as the weight of the bag overcomes the resistance of the rough surface loop. Another problem is that the open bag cannot be easily closed. The user must provide a separate cover and adapt the cover to the described device. This necessitates the collection of covers of varying sizes to accommodate the different trash bag available.

U.S. Pat. Nos. 4,549,748 and 5,048,778 relate to a bag holding device for use in collecting and conveying trash. The bag holding cart is comprised of a pair of inverted U-shaped frame support members pivotally connected at about their respective centers. A foldable base is provided to the lower portion of the cart. The cart is movable along conventional wheels or casters for transport. The upper portion of each inverted U-shaped support member is provided with bag retention bars. A hand actuated cover effects closure. This bag holding cart suffers from several deficiencies and disadvantages. One disadvantage is that the cart is rather bulky and cumbersome, even in its folded state. Another problem is that tile slidable cover must be opened and closed by hand. Such hand operation can be problematic, especially if the cart operator is loaded down with trash. In that case, the operator must first put the load down, then open the cover, and finally pick up the load again and deposit it into a bag supported on tile cart. Accordingly, the hand actuated cover leads to labor inefficiency during cart use.

U.S. Pat. No. 4,793,628 and U.S. Pat. No. 5,251,925 disclose devices similar to the device described in U.S. Pat. No. 4,549,748. These devices attempt to correct the problem of the hand-actuated cover by providing for a hinged, foot activated cover. The user is able to depress a pedal located at the base of the device. The pedal activates the hinged cover thereby allowing the user to place the waste in the trash bag conveniently. Unfortunately, this mechanism adds to the complexity of the device. This increases the production cost of the device. This also generates more parts to wear out or break.

U.S. Pat. No. 4,917,393 teaches a trolley for carrying bags having a rotatable base and flexible support legs at the top. The user places the closed end of a trash bag on the rotatable base. The open end of a trash bag is then mounted to an adjustable heavy wire rack. The rack is then manipulated to provide support and to hold the trash bag in an open position. When the trash bag has been filled the user would then twist the trash bag by rotating the base. The user would then seal the trash bag with a wire, plastic tie, or the like. One problem with a device of this type is that in order to utilize the rotatable base the trash bag can only be filled to approximately half it's available volume. This leads to waste of materials and to increase the time required to complete a job due to changing and moving the increased number of trash bag. Another problem is that the device requires a large number of parts thereby increasing the cost of the device. Additionally, the user must adjust several complicated systems on the trolley for effective operation of the device. This complex operation results in inefficient use of the operator's time and effort in completing the job.

U.S. Pat. No. 5,456,431 discloses a mobile support for a trash bag with a base support for the closed end of the trash bag. The trash bag is secured at its open end by an adjustable clamp surrounding a mounting loop. The edge adjacent the open end of the trash bag is folded over the mounting loop. The adjustable clamp is then tightened to secure the trash bag to the mounting loop. The closed end of the trash bag rests upon a base plate mounted above a tripod arrangement of casters or rollers. The trash bag is then moved about as the need arises during filing. One problem associated with devices of this type is that no mechanism to easily close the trash bag when the trash bag is stored while partially filled is provided. Additional the arrangement of the wheels while quite effective in movement over the smooth surface of a parking lot, side walk, driveway, or the like, the apparatus as disclosed is not suited for movement over irregular terrain such as the yard area of a home. The folding and adjusting mechanisms requires the cooperation of a complex and intricate set of parts. This complexity increases the cost of production and inefficiency of the device.

SUMMARY OF THE INVENTION

I have provided a highly versatile, lightweight, utility cart that can be folded for convenient storage or quickly unfolded for a number of uses. In the best mode my mobile, collapsible cart automatically grasps and secures a trash bag for proper handling.

In the best mode my cart comprises separate, readily assembled components. The cart is foldable for ease of storage when not in use. The cart includes a vertical U-shaped main frame. An upper cross member of the main frame provides a handle for the cart. A U-shaped, tubular subframe is hinged to the main frame and free to swing outwardly in response to gravity. Unique spring clips that extend horizontally between opposite sides of the frame and subframe are seated within suitable orifices defined in the fame and subframe sides. These clips mount the bag and suspend it in an open position. The bag to be held open is disposed over suitable notches formed on each end of the clips. Proper initial insertion of a trash bag enables the cart to firmly captivate and hold open a flexible trash bag. As the subframe is allowed to drop by gravity, it automatically stretches the bag into an open position, exposing a convenient mouth through which articles may be inserted into the bag. In response to stretching, the bag is frictionally captivated by contact with the clip notches and a frictional wedging action securely holds the bag in a convenient, readily accessible open position. The foldable subframe provides an effective and simple means for closing the bag during use or storage.

Bag support and control is achieved by the unique shape of the spring clips. Preferably, each clip is formed of heavy, spring wire rod. By manually deforming the clip, its ends may be inserted into appropriate orifices defined in the frame and subframe. When released, the clips spring back to their original configuration as the clip ends are seated within the frame orifices, and the clips are thus pivotally suspended from the frame members. The notches defined between the spaced apart clip ends and the clip midsection allows a flexible trash bag to be quickly and easily positioned and folded over the spring clips and through the notches for frictional containment. As the subframe rotates to a stable position, the clips, which are also free to rotate, grasp the bag, spread it apart, and firmly grasp it. The clips may be variably positioned between suitable aligned orifices to accommodate trash bag of various sizes, strengths, and shapes.

Thus the basic object of the invention is to provide a simple means for supporting, attaching and holding open a trash bag.

Another basic object is to provide a portable, wheeled utility cart that firmly and automatically controls trash bags in the manner described.

Another fundamental object is to provide a mobile leaf or garbage bag cart that accommodates a variety of trash bag sizes.

Another basic object is to provide a highly versatile cart of the character described that readily collapses for convenient storage and transportation.

A further object is to produce a leaf or garbage bag cart that is lightweight and easy to use.

A more basic object of the present invention is to provide a leaf or garbage bag cart that is movable about the terrain commonly encountered in the home yard.

A related object is to provide a leaf or garbage bag cart of the character described that will maintain a trash bag in a closed state during storage. It is a feature of my device that it is self-closing.

Another basic object of the invention is to provide a simple means for the attachment and removal of a trash bag before and after use.

A related object is to provide leaf or garbage bag cart that is simple for one operator to use.

These and other objects and advantages of the present invention, along with features of novelty appurtenant thereto, will appear or become apparent in the course of the following descriptive sections.

BRIEF DESCRIPTION OF THE DRAWINGS

In tile following drawings, which form a part of the specification and which are to be construed in conjunction therewith, and in which like reference numerals have been employed throughout wherever possible to indicate like parts in the various views.

DETAILED DESCRIPTION

Figure 1:
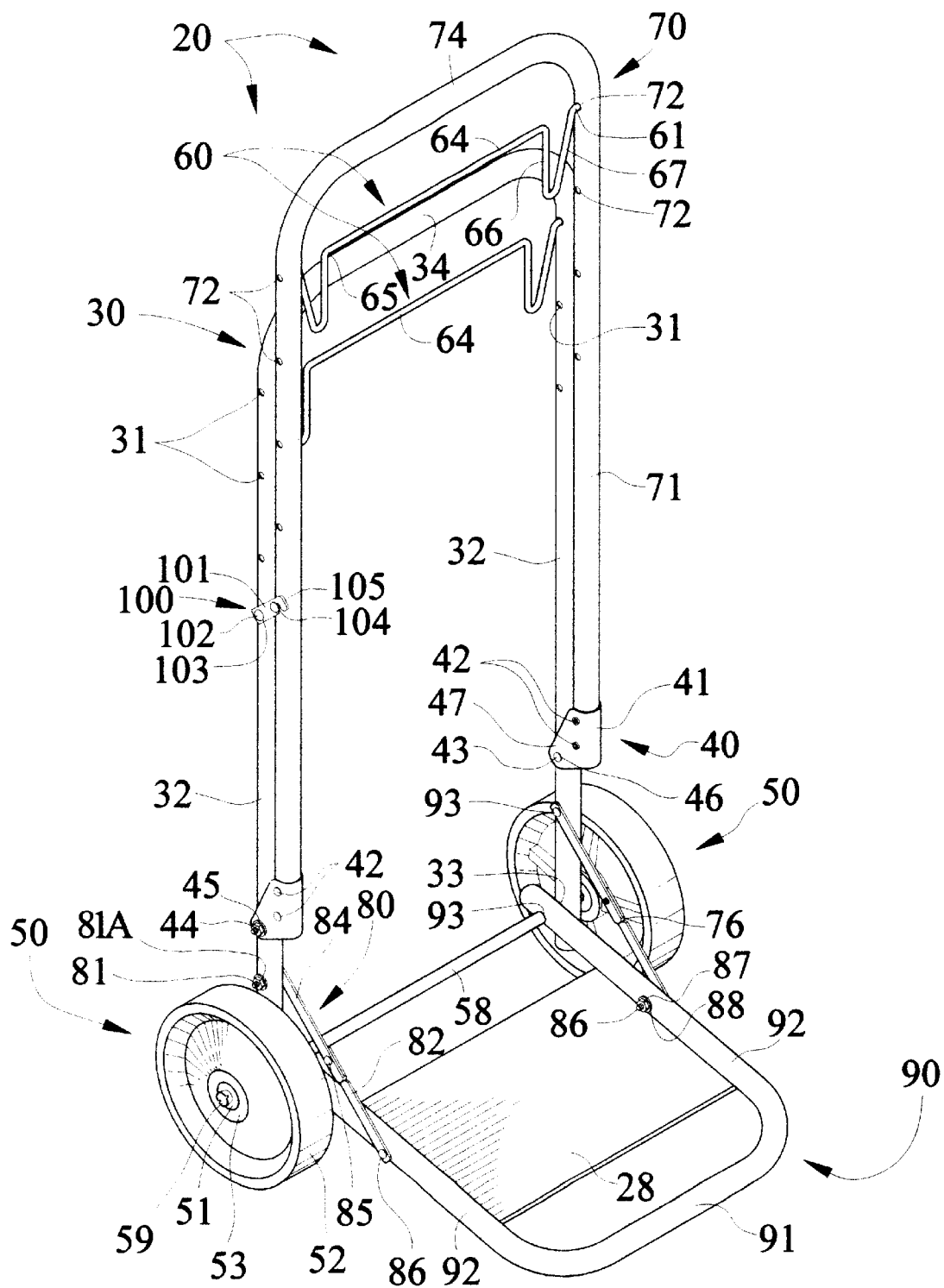
FIG. 1 is front isometric view of the preferred cart, showing it partially deployed for use.
Figure 4:
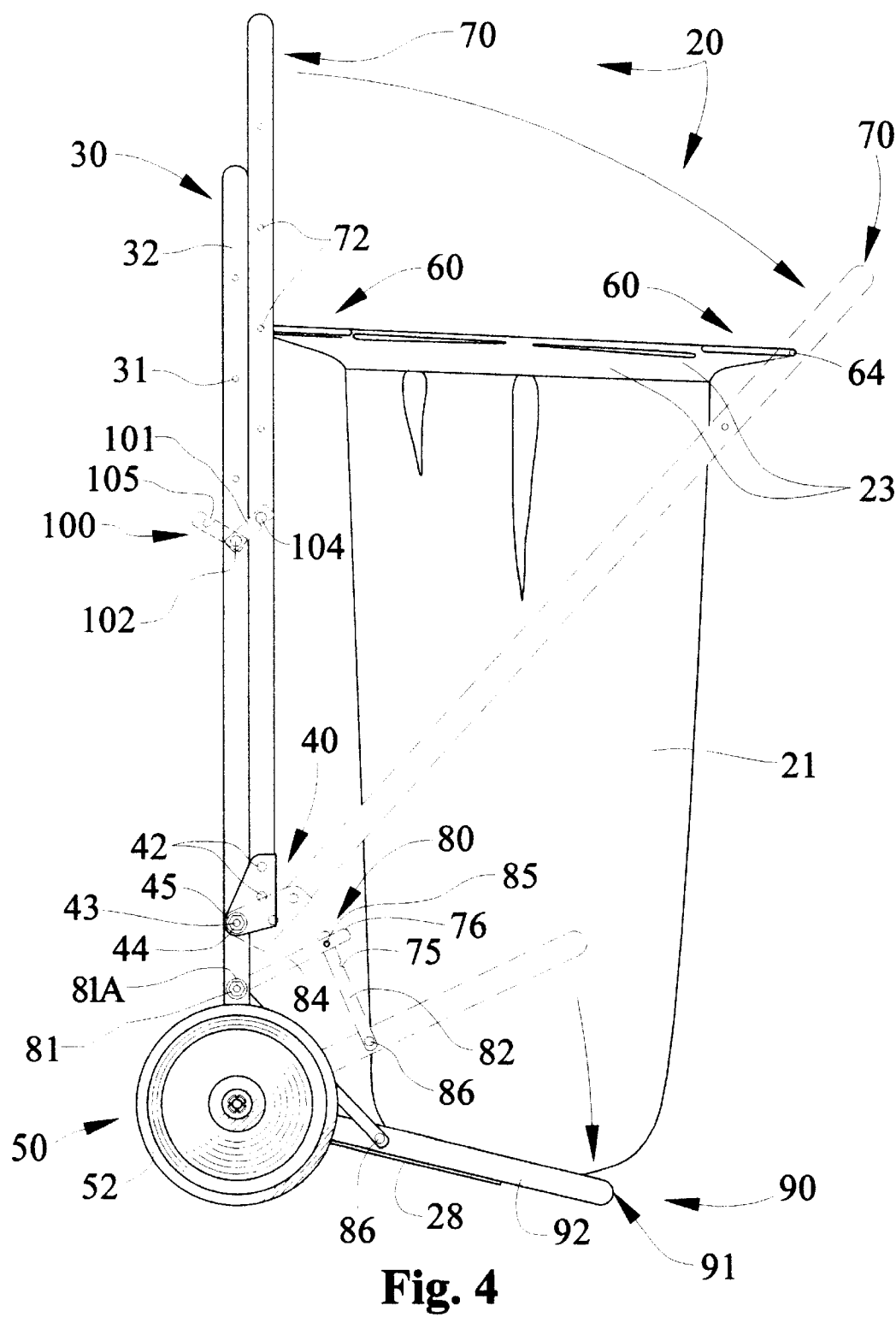
FIG. 4 is a side elevational view of the cart with the subframe shown in a moved position to hold a trash bag.
Figure 6:
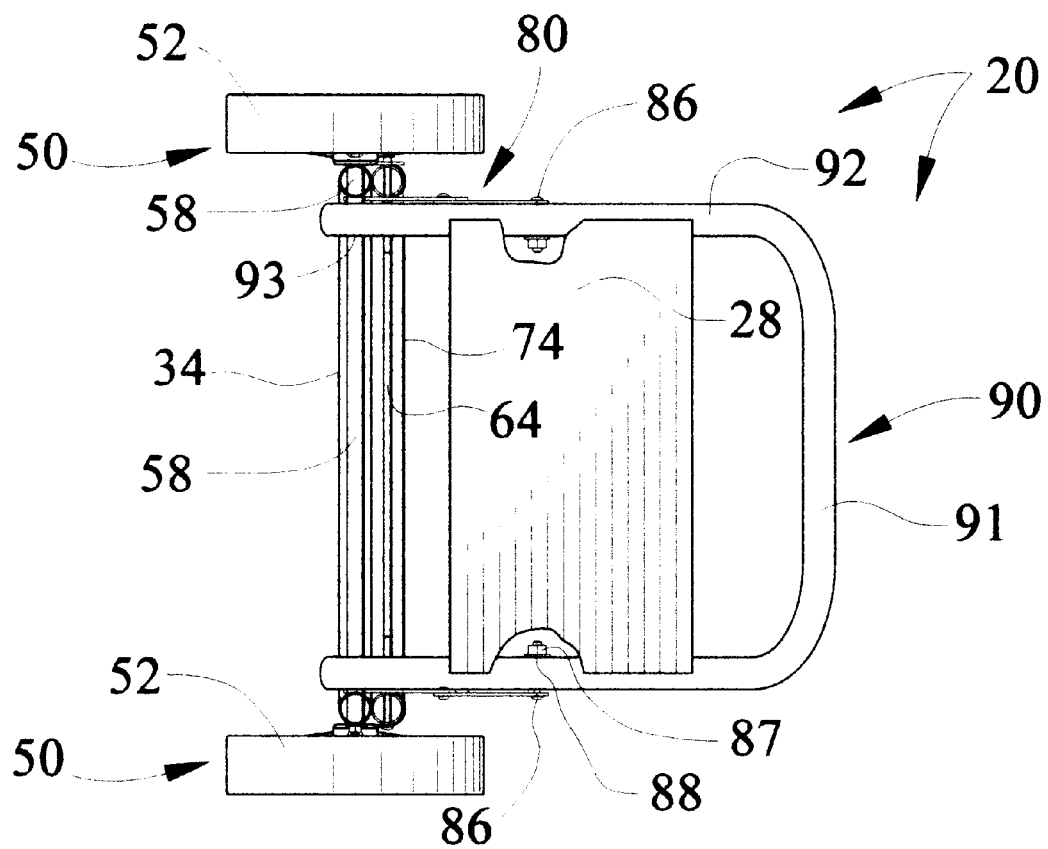
FIG. 6 is a bottom plan view as seen from the bottom of FIG. 4.
Figure 7:
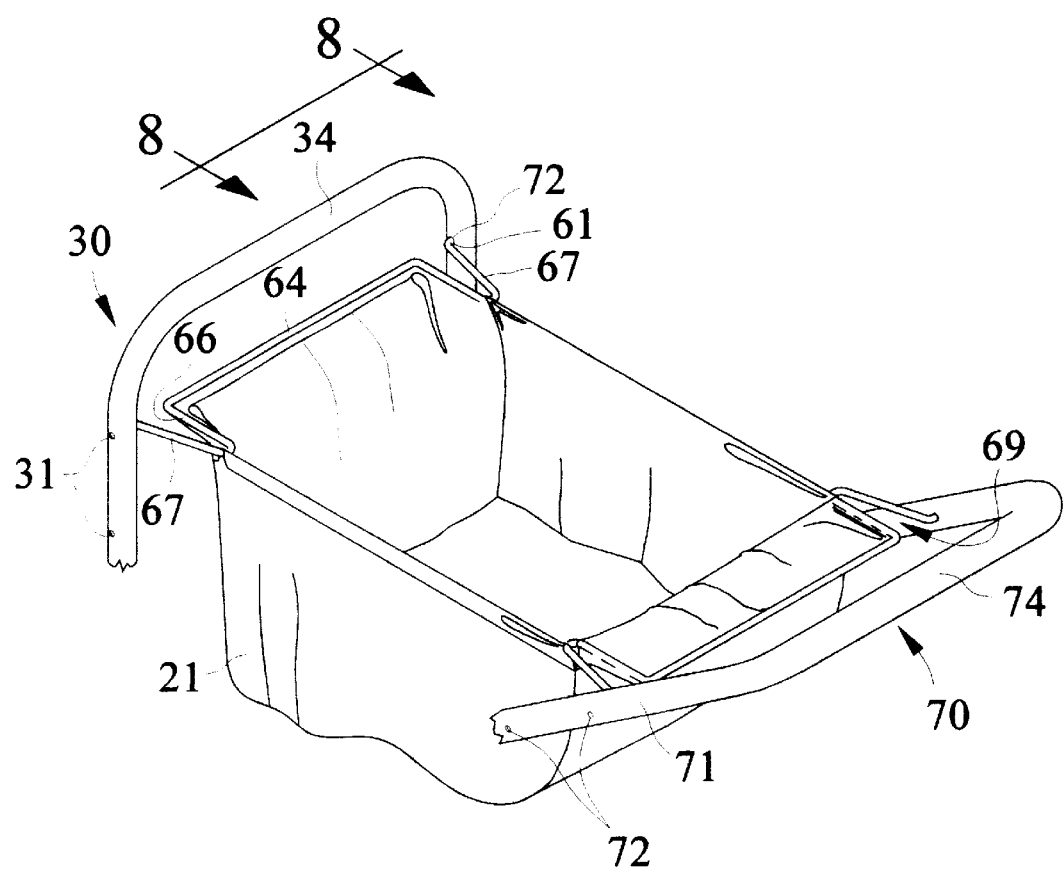
FIG. 7 is an enlarged, fragmentary isometric view of the cart with the subframe deployed to captivate a bag; and, FIG. 8 is an enlarged, fragmentary isometric view taken generally along line 8—8 in FIG. 7.
Figure 8:
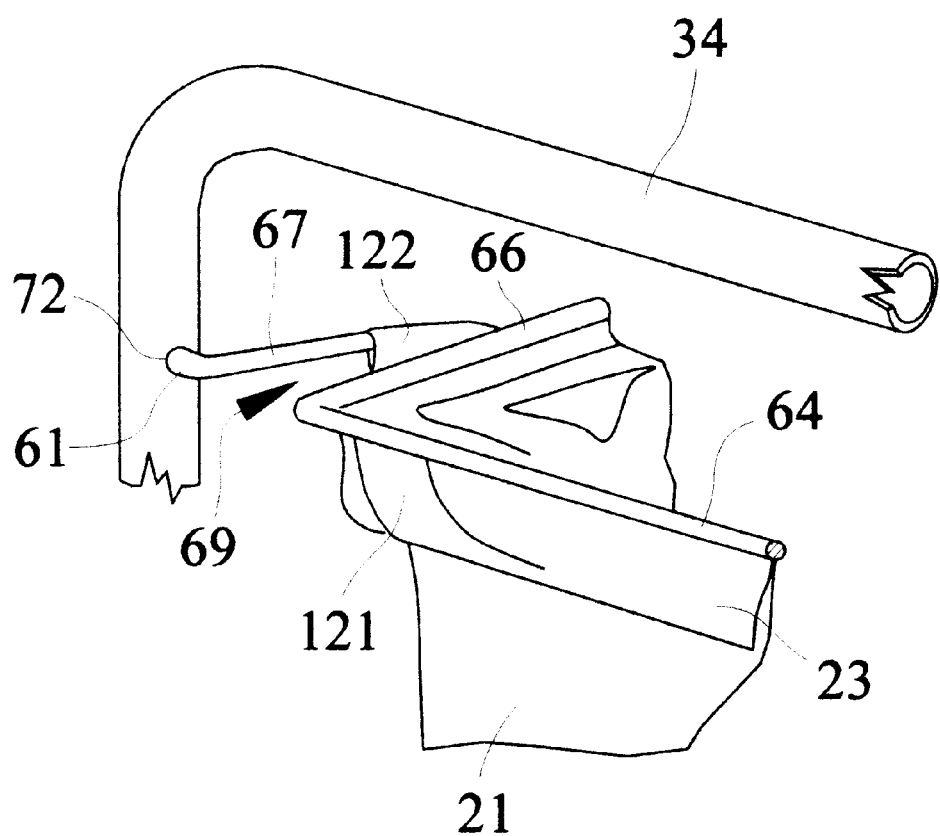

Referring more specifically to the drawings, FIG. 1 shows the assembled cart 20 in a partially deployed position. Cart 20 comprises an inverted, U-shaped main frame 30 that extends generally from the ground to an upper transverse handle 34. Pivotally attached to frame 30 by bracket assemblies 40 is an inverted, U-shaped subframe 70 for capturing and selectively opening a trash bag 21 (FIGS. 4, 7, 8). A lower, U-shaped platform 90 is rotatably captured at tile ends of its spaced-apart legs 92 by the transversely oriented axle 58 (FIGS. 1, 6). Axle 58 extends through legs 92 and penetrates the lower ends of the U-shaped main frame legs 32.

Wheel assembly 50 is rotatably mounted at each end of axle 58 (FIG. 1). A folding lock mechanism 80 (FIGS. 1, 4) comprising pivotally connected, foldable linear elements 82 and 84 can be deployed to releasably unfold the platform 90. Element 84 is pivotally fastened at an outer end to the lower end of frame leg 32 by nut 81 and bolt 81A. The outermost end of element 82 is pivoted to platform leg 92 by fastener 86. The innermost ends of elements 82 and 84 are pivoted together.

Figure 2:
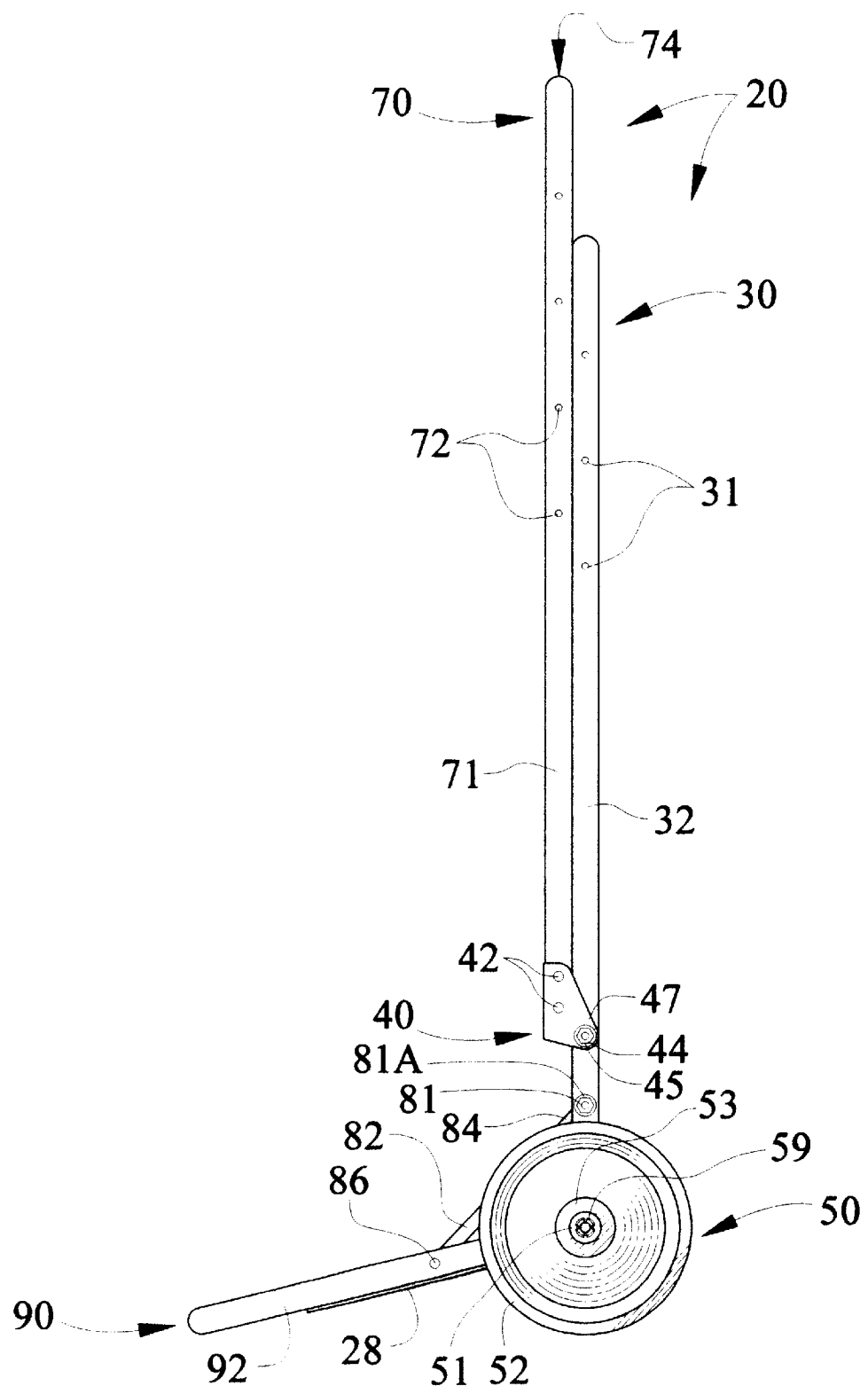
FIG. 2 is a side elevational view of cart of FIG. 1.
Figure 3:
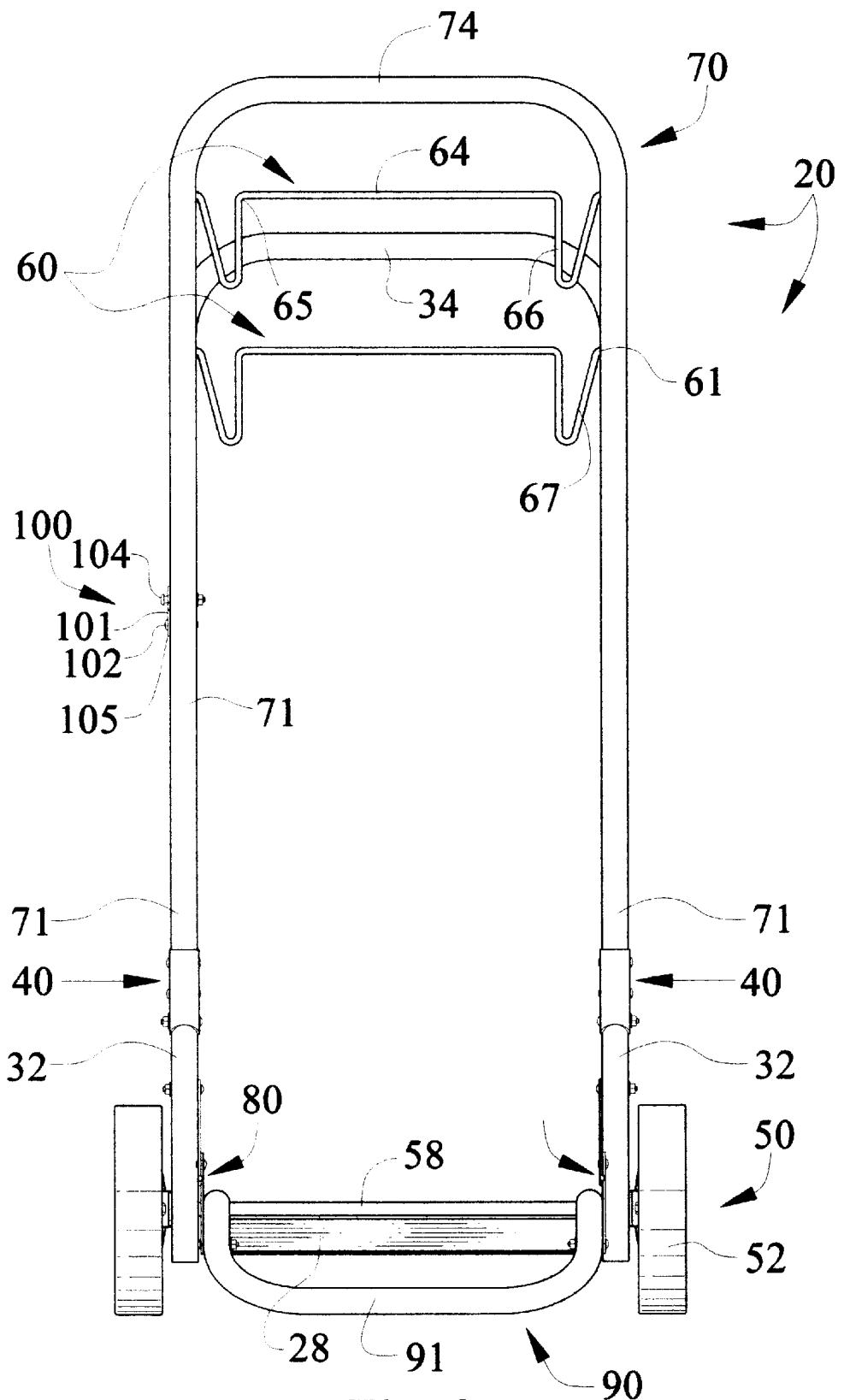
FIG. 3 is a front plan view of the cart of FIGS. 1 and 2.
Figure 5:
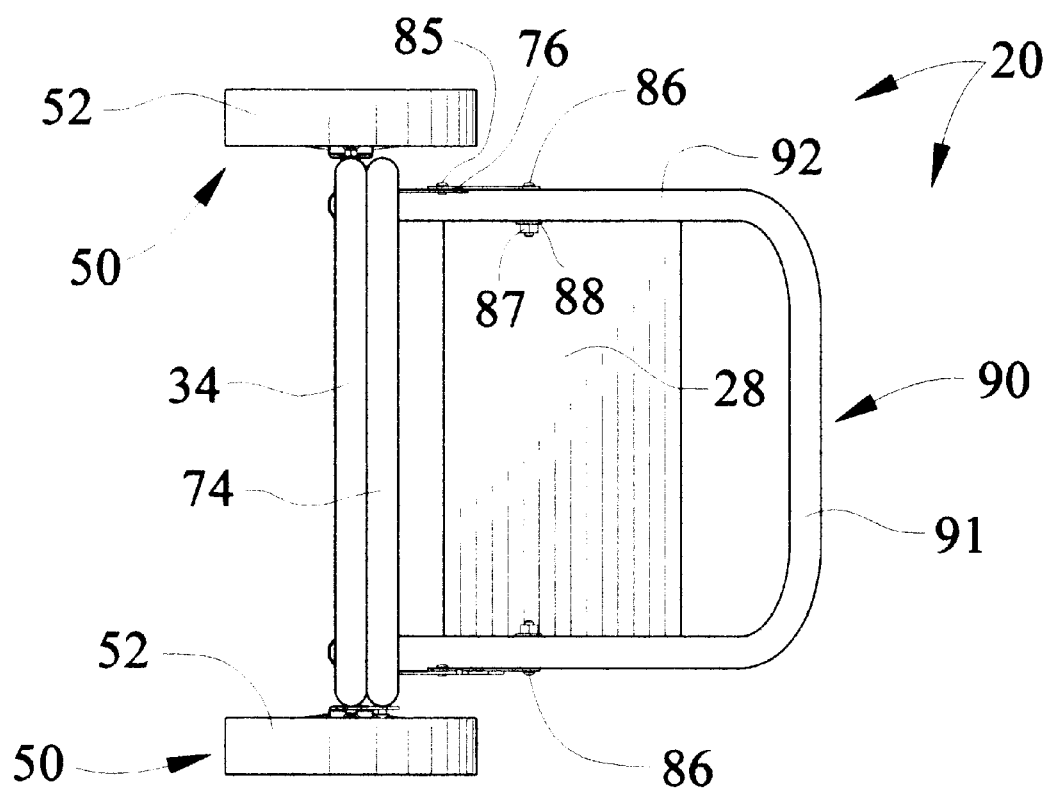
FIG. 5 is a top plan view as seen from the top of FIG. 4.

In the best mode, the U-shaped main frame 30 is inverted. Two parallel, spaced apart legs 32 extend downwardly (FIGS. 1, 2) from an integral crosspiece 34 that functions as a handle for cart 20 (FIGS. 1, 3, 5). A plurality of regularly spaced apart adjustment orifices 31 are disposed along the upper end of legs 32 (FIGS. 1, 2, 4) for rotatably captivating the ends of clip 60. A lock 100 (FIGS. 1, 4) is rotatably secured to one leg 32. Lock 100 comprises a rectangular bar 101 having inner end 103 rotatably secured to one leg 32 by rivet 102. A notched end 105 adapted to engage pin 104 is located at the other end of bar 105 such that rotating bar 105 normally secures subframe 70 to main frame 30 (FIGS. 1,4) to facilitate compact storage of tile cart when not in use. Transverse axle 58 passes through openings 33 at tile lower ends of frame legs 32.

In the best mode a pair of spaced apart, and generally parallel spring wire clips 60 (FIGS. 1, 3) are resiliently inserted between opposed horizontal portions of the cart. One clip extending between the tipper ends of frame legs 32 pivotally registers within spaced apart adjustment holes 31. The other spring clip 60 is similarly mounted between tile upper ends of subframe legs 71, penetrating the aligned adjustment orifices 73 (FIGS. 1, 2).

The extended cap portions 59 of axle 58 serve as mounts for wheels 52 (FIGS. 1,6). Wheel assembly 50 comprises wheels 52 attached to the extended portion 59 of axle 58 (FIG. 1). Wheels 52 are secured by axle cap nuts 51 secured against axle washers 53.

In the best mode, foldable subframe 70 comprises an inverted U-shaped tubular frame having two, parallel and spaced-apart legs 71 extending downwardly (FIGS. 1–4). Integral cross piece 74 (FIGS. 1, 3) serves as a handle for moving or deflecting subframe 70 to selectively open a trash bag 21 (FIG. 4). Subframe 70 has a plurality of attachment orifices disposed along the upper end of its legs 71 (FIGS. 1,2, 4) for pivotally anchoring and captivating a clip 60. The lower ends of legs 71 are secured by a bracket assembly 40 (FIGS. 1, 4). Each bracket assembly 40 comprises a generally U-shaped sleeve 41 with an offset ear 47. Legs 71 are firmly secured to bracket assembly 40 by rivets 42 through sleeve 41. Bracket assembly 40 is hinged to main frame legs 32 by bolt 43 extending though cap orifice 46 in ear 47 (FIGS. 1, 4) and openings (not shown) in legs 32. Washer 45 and nut 44 secure bolt 43.

A deployable platform 90 for supporting a trash bag 21 (FIG. 4) comprises a generally U-shaped, tubular base having two legs 92 connected by integral cross member 91 (FIGS. 5, 6). Legs 92 are rotatably captured at their ends by axle 58 that extends through orifices 93 (FIGS. 1,6). Axle 58 is disposed generally parallel with cross member 91. In the best mode, a thin, metallic platform 28 extending between and beneath the platform legs 92 (FIG. 6) is spot-welded beneath the legs, but it could be mounted on top of them. Alternatively, the platform may be formed of a resilient plastic or cloth sheet extending either between platform legs 92, or platform cross member 91 and the spaced apart axle 58.

After lock 100 is released, locking brace 80 (FIGS. 1, 4) pivotally elongates for securing the platform in its extended position. Elements 82, 84 are rotatably connected together at their ends by rivet 85. The other end of element 82 is rotatably attached to platform leg 92 by bolt 86. Washer 88 and nut 87 secure bolt 86. The other end of element 84 is rotatably attached to the lower end of frame leg 32 by bolt 83. Nut 81 and washer 81 A secure bolt 83. Element 82 has a notch 75 (FIG. 4) adapted to frictionally abut tab 76 (FIG. 4) projecting from element 84 (FIG. 5).

Each bag-supporting clip 60 comprises a heavy wire adapted to receive and secure a trash bag 21 (FIG. 4). These clips are resiliently deformable, so that they may be gently bent by the user for deployment between the legs of the frame or subframe. Each clip 60 comprises a horizontal mid segment 64 (FIGS. 1,3) with V-shaped notches at each end; this particular configuration enhances clip springiness. The end of segment 64 is bent at a 90-degree angle downward forming leg 66 perpendicular to mid segment 64 (FIG. 3) with a sharp corner 65 defined therebetween. The end of leg 66 is bent forming upwardly extending leg 67. Leg 67 is bent to an angle greater than 90 degrees such that the ends of clip 60 have a generally V-shaped profile (FIGS. 1,3, 8). A friction notch 69 is thus defined at each end of each clip, within the V-shaped region discussed. Each end of clip 60 terminates in a short, angled terminal portion 61 that is designed to penetrate and pivotally seat within attachment holes 31 and 73 located on legs 32 and 71.

Operation

The operation of my wheeled, foldable leaf or garbage bag cart 20 can best be seen in FIG. 1. An operator (not shown) places the cart on the ground in preparation for use. Then lock 100 is disengaged. The operator extends the U-shaped subframe by disengaging bar 105 from pin 104 thereby allowing second subframe 70 to rotate about bolt 43 (FIG. 4). Platform 90 is placed in its operative position by pulling cross member 91 downwardly (FIGS. 1,4). The operator then engages brace 80 by locking the tab of element 84 into engagement with the notch of element 82 (FIG. 4). The bag edge 23 (FIG. 8) adjacent the open end of a trash bag 21 is folded over the mid segment 64 of clamp 60 (FIG. 4, 8). Subframe 70 further extends, causing clamp 60 to firmly grip bag 21 and to hold bag 21 in an open position for filling (FIG. 4). A generally rectangular mouth is presented by the bag because of the clips. Subframe 70 gravitationally extends to the distance necessary for the particular size bag 21 being used.

At this time the bag edges are disposed about the clips. As best seen in FIGS. 7 and 8, the front and rear edges of the bag are gently rolled over the midsections 64 of the pivoted clips. Major portions of the rear bag edge are designated with the reference numeral 121 (FIG. 8). A companion portion 122 (FIG. 8) is spaced apart from portion 121, frictionally disposed within the V-portion of the clip within notch 69. The front edge of tile bag is similarly frictionally constrained by placement upon the clip associated with the subframe 70. As subframe 70 is allowed to gently fold outwardly from the frame, (i.e., towards the position of FIG. 4) tile bag will be firmly captivated. The bag should be vertically positioned such that its bottom will tend to rest firmly upon the lower platform, particularly as the bag fills tip. The relative vertical positions of the clips may thus be adjusted- the clips need merely be snapped into position between a suitable pair of registering orifices in tile spaced apart legs of the frame or subframe. Cart 20 may then be moved about the job site for filling. The subframe 70 may be drawn slightly towards the main frame 30 to help close and tie the filled bag. Lock 100 is then engaged, thereby securely sealing the trash bag 21 when placed in storage.

From tile foregoing, it will be seen that this invention is one well adapted to obtain all tile ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A wheeled utility cart for handling bags, said cart comprising:

a rigid, generally U-shaped frame comprising a pair of spaced-apart, parallel, and generally vertically oriented legs and an integral cross-member extending between the legs forming an upper cart handle, the frame legs comprising bottom portions;

wheels for enabling locomotion of said cart, said wheels coupled to said frame leg bottom portions;

a rigid, generally U-shaped subframe substantially similar in size to said U-shaped frame, said subframe comprising a pair of spaced apart legs and a cross member forming an upper subframe handle, said subframe legs comprising lower portions pivoted to said frame legs above said wheels, the subframe selectively displaceable between a generally flat storage position nested against said frame and a deployed position wherein the subframe is angularly pivoted away from said frame;

each frame leg comprising insides facing each other and a plurality of vertically, spaced-apart mounting orifices formed on the inside of the leg, with the mounting orifices on one frame leg facing the other mounting orifices on the other frame leg;

each subframe leg comprising insides facing each other and a plurality of vertically, spaced-apart mounting orifices formed on the inside of the subframe leg, with the mounting orifices on one subframe leg facing the other mounting orifices on the other subframe leg;

a first resilient, horizontally-extending clip for holding a bag, the first clip being yieldably, user-fitted to the frame at a user-selected elevation above said wheels, the first clip pivotally captivated between and within said frame legs below said frame handle, and perpendicularly extending between said frame legs;

a second resilient horizontally-extending clip for holding a bag, the second clip being parallel with said first clip and yieldably, user-fitted to the subframe at a user-selected elevation above said wheels, the second clip pivotally captivated between and within said subframe legs below said subframe handle, and perpendicularly extending between said subframe legs;

the first and second clips each comprising an elongated mid-portion, a pair of integral clip ends parallel with said mid-portion and adapted to be pivotally fitted within said mounting orifices, and V-shaped notches disposed between said clip ends and said clip mid-portions for captivating said bags; and, a platform pivoted at the bottom of said frame and adapted to be switched between a storage position nested against said frame and a generally horizontally-deployed position beneath said subframe.

2. The wheeled utility cart of claim 1 further comprising locking means for selectively securing said subframe in a folded position nested against said frame.

3. The wheeled utility cart of claim 2 further comprising brace means for selectively locking said platform in a deployed position.

* * * * *